(12) United States Patent
Smith (10) Patent No.: US 7,959,240 B2
(45) Date of Patent: Jun. 14, 2011

(54) WALL-MOUNTED APPLIANCE CABINET WITH APPLIANCE SUPPORTS, AN ELECTRICAL OUTLET AND A CORD MANAGEMENT SYSTEM

(76) Inventor: Randell E. Smith, Macclenny, FL (US)

( * ) Notice: Subject to any disclaimer, the term of this patent is extended or adjusted under 35 U.S.C. 154(b) by 658 days.

(21) Appl. No.: 12/014,763

(22) Filed: Jan. 15, 2008

(65) Prior Publication Data

US 2008/0169251 A1 Jul. 17, 2008

Related U.S. Application Data (60) Provisional application No. 60/885,049, filed on Jan. 16, 2007.

(51) Int. Cl.
*A47B 67/02* (2006.01)
(52) U.S. Cl. .................. 312/242; 312/223.6; 312/319.4
(58) Field of Classification Search ............... 312/223.4, 312/223.6, 245, 326, 351.1, 351.3, 242, 319.4; 439/501; 174/50, 53, 58; 248/51; 242/388.9, 242/388.91
See application file for complete search history.

(56) References Cited

U.S. PATENT DOCUMENTS

| | | | | |
|---|---|---|---|---|
| 1,515,505 A * | 11/1924 | McJohn | ............ | 38/104 |
| 1,557,033 A * | 10/1925 | Davis | ............ | 242/388.9 |
| 2,214,759 A * | 9/1940 | Bosch, Jr. | ............ | 242/388.9 |
| 2,680,789 A * | 6/1954 | Robinson | ............ | 191/12 S |
| 2,690,945 A * | 10/1954 | Bronk | ............ | 312/22 |
| 3,391,875 A * | 7/1968 | Hamrick | ............ | 242/388.9 |
| 3,753,047 A * | 8/1973 | Shallbetter | ............ | 361/672 |
| 3,866,869 A * | 2/1975 | Woods | ............ | 248/51 |
| 4,930,717 A * | 6/1990 | de la Haye | ............ | 242/388.9 |
| 5,065,964 A * | 11/1991 | Polak | ............ | 248/51 |
| 5,394,809 A * | 3/1995 | Feldpausch et al. | ............ | 108/147.21 |
| 5,577,819 A * | 11/1996 | Olsen | ............ | 312/242 |
| 5,686,700 A * | 11/1997 | Carpinella | ............ | 174/650 |
| 5,917,694 A * | 6/1999 | Denny | ............ | 361/643 |
| 5,933,563 A * | 8/1999 | Schaffer et al. | ............ | 385/135 |
| 5,994,644 A * | 11/1999 | Rindoks et al. | ............ | 174/495 |
| 6,095,156 A * | 8/2000 | Smith, II | ............ | 132/286 |
| 6,305,388 B1 * | 10/2001 | Zeller | ............ | 132/314 |
| 6,460,951 B1 * | 10/2002 | Baxter et al. | ............ | 312/257.1 |
| 6,732,660 B2 * | 5/2004 | Dame et al. | ............ | 108/50.01 |
| 2005/0011844 A1 * | 1/2005 | Magnusson et al. | ............ | 211/103 |
| 2005/0217886 A1 * | 10/2005 | Young | ............ | 174/53 |

* cited by examiner

*Primary Examiner* — Darnell M Jayne
*Assistant Examiner* — Matthew W Ing
(74) *Attorney, Agent, or Firm* — Mark Young, P.A.

(57) ABSTRACT

A wall mounted cabinet includes a plurality of removable supports configurable for holding a variety of objects, including an electrical appliance, one or more shelves and cups. The cabinet also includes one or more apertures for electrical outlets for supplying electrical power to the appliance. An electrical cord management device is provided for controllably extending and retracting the cord to facilitate use of the appliance and storage of the cord.

12 Claims, 7 Drawing Sheets

WALL-MOUNTED APPLIANCE CABINET WITH APPLIANCE SUPPORTS, AN ELECTRICAL OUTLET AND A CORD MANAGEMENT SYSTEM

RELATED APPLICATION

This application claims the benefit of priority of U.S. provisional application 60/885,049, filed Jan. 16, 2007, the entire contents of which are incorporated herein by this reference.

FIELD OF THE INVENTION

This invention relates generally to wall mounted cabinets of the type used in residential dwellings as medicine cabinets to store medicines and toiletries, and more particularly, to a cabinet with clamps for holding an electrical appliance, an electrical outlet for supplying electrical power to the appliance, and an electrical cord management device for controllably extending and retracting the cord to facilitate use of the appliance and storage of the cord.

BACKGROUND

Medicine cabinets with shelves are well known in the art. They allow a user to store a number of objects such as medicines and toiletries. Conventional medicine cabinets commonly include a shallow and forwardly open cabinet housing adapted to fit into a correspondingly sized opening formed in a wall of a residential bathroom or the like, typically during the construction phase. A mirror door is hingedly mounted at one side of the cabinet housing for swinging movement between closed and open positions. A magnetic or friction spring catch is provided to hold the door in a closed position. When closed, the mirror door supports a mirror for convenient use in grooming. In the open position, the mirror door exposes an interior compartment, which typically includes a plurality of parallel shelves for supporting objects.

While conventional medicine cabinets are useful for holding a variety of small objects such as medicines and toiletries, they are not well suited to hold electrical appliances used for routine grooming. Appliances such as an electric razor, hair dryer and/or curling iron are typically too large for the spaces between shelves of a medicine cabinet. Additionally, even if adequate space is provided on a shelf, an appliance risks falling from a shelf when the door is open. Furthermore, the interior compartment typically lacks any electrical outlet and cord management system. Thus, even if adequate storage space is provided to accommodate an appliance, electric power must be supplied through a separate remote outlet. In such cases, excess cord may dangerously drape into a sink, upset objects standing on the edge of the sink or a vanity countertop and create an unsightly mess. Inconveniently, storage entails unplugging the cord from an outlet, winding the cord around the appliance and tossing the appliance into a storage location for use another time. To avoid the hassle of storage, many users leave the appliances plugged in and/or resting on the edge of the sink or a vanity countertop, despite the danger of electrocution, risk of damage to the appliance and unsightly mess.

Accordingly, there is a need for a cabinet with clamps for holding an electrical appliance, an electrical outlet for supplying electrical power to the appliance, and an electrical cord management device for controllably extending and retracting the cord to facilitate use of the appliance and storage of the cord. The invention is directed to overcoming one or more of the problems and solving one or more of the needs as set forth above.

SUMMARY OF THE INVENTION

To solve one or more of the problems set forth above, in an exemplary implementation of the invention, a wall mountable cabinet with clamps for holding an electrical appliance, an electrical outlet for supplying electrical power to the appliance, and an electrical cord management device for controllably extending and retracting the cord to facilitate use of the appliance and storage of the cord is provided. The wall mountable cabinet includes a housing defining an interior compartment with a top, bottom, left side and right side; a door hingedly mounted to the housing; a plurality of supports attached to the housing and configured to support a plurality of objects within the interior compartment, the plurality of objects includes at least one electrical appliance; an aperture in the housing, the aperture configured for receiving an electrical outlet for supplying electrical power to the electrical appliance; and an electrical cord management device for controllably extending and retracting an electrical cord of an electrical appliance to facilitate use of the appliance and storage of the cord, the at least one electrical cord management device being attached to the bottom of the housing.

In another aspect of an exemplary embodiment the at least one electrical cord management device includes a tube containing a cord weight. The cord weight includes a mass and a means for movable attachment to the electrical cord, the cord weight being disposed within and movable along a longitudinal axis of the tube from a top position of the tube to bottom position of the tube.

In another aspect of an exemplary embodiment the at least one electrical cord management device includes a tube containing a cord weight. The cord weight includes a mass and a slider coupling configured for sliding engagement of the electrical cord, the cord weight being movable from a top position of the tube to bottom position of the tube.

In another aspect of an exemplary embodiment the at least one electrical cord management device includes a tube containing a cord weight. The cord weight includes an adjustable mass assembly and a slider coupling configured for sliding engagement of the electrical cord, the cord weight being movable from a top position of the tube to bottom position of the tube, the adjustable mass assembly being selectively adjustable from a first mass to a second mass by defining a number of mass units to constitute the adjustable mass assembly.

In another aspect of an exemplary embodiment the at least one electrical cord management device includes a tube containing a cord weight. The cord weight includes a mass assembly and a slider coupling configured for sliding engagement of the electrical cord, the cord weight being movable from a top position of the tube to bottom position of the tube, the tube includes a plurality of attached tubular sections.

In another aspect of an exemplary embodiment the at least one electrical cord management device includes a tube containing a cord weight. The cord weight includes a mass assembly and a slider coupling configured for sliding engagement of the electrical cord, the cord weight being movable from a top position of the tube to bottom position of the tube, the tube includes a plurality of telescopically coupled tubular sections.

In another aspect of an exemplary embodiment the at least one electrical cord management device includes a tube containing a cord weight. The cord weight includes a mass assembly and a slider coupling configured for sliding engagement of the electrical cord, the cord weight being movable from a top position of the tube to bottom position of the tube, the tube includes a bottom end configured to prevent passage of the cord weight below the bottom end.

In another aspect of an exemplary embodiment the at least one electrical cord management device includes a tube containing a cord weight. The cord weight includes a mass assembly and a slider coupling configured for sliding engagement of the electrical cord, the cord weight being movable from a top position of the tube to bottom position of the tube, the tube includes a closed bottom end.

In another aspect of an exemplary embodiment the at least one electrical cord management device includes a tube containing a cord weight. The cord weight includes a mass assembly and a slider coupling configured for sliding engagement of the electrical cord, the cord weight being movable from a top position of the tube to bottom position of the tube, the tube includes a top cap having at least one aperture for passage of the electrical cord.

In another aspect of an exemplary embodiment the at least one electrical cord management device includes a tube containing a cord weight. The cord weight includes a mass and a means for movable attachment to the electrical cord, the cord weight being disposed within and movable along a longitudinal axis of the tube from a top position of the tube to bottom position of the tube, the tube includes a plurality of telescopically coupled tubular sections. The tube includes a closed bottom end and a top cap having at least one aperture for passage of the electrical cord.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes, ornamental aspects or proportions shown in the figures.

DETAILED DESCRIPTION

Figure 1:
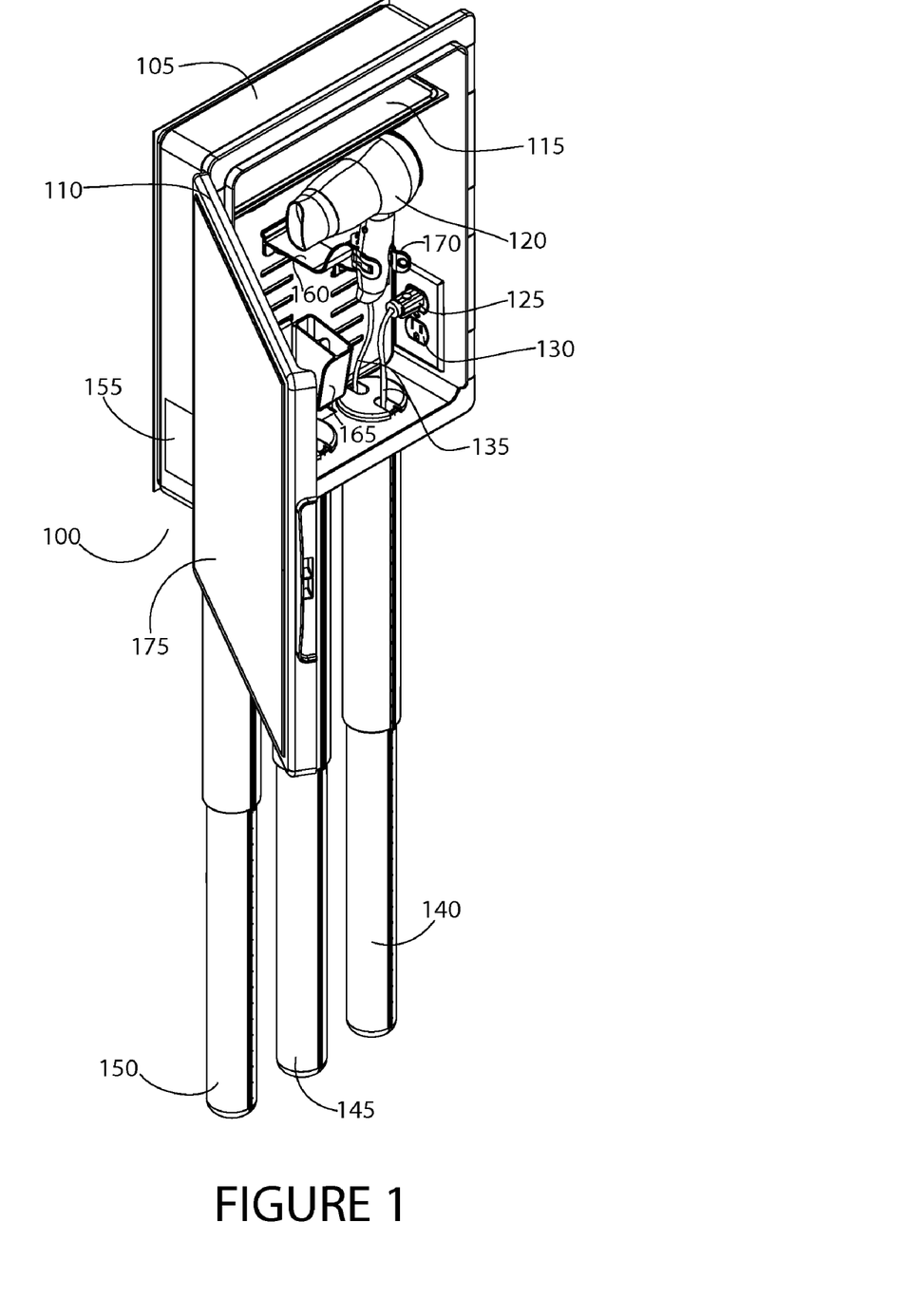
FIG. 1 shows a front perspective view of an exemplary cabinet, in an open position, with clamps for holding an electrical appliance, an electrical outlet for supplying electrical power to the appliance, and an electrical cord management device for controllably extending and retracting the cord to facilitate use of the appliance and storage of the cord, according to principles of the invention.
Figure 2:
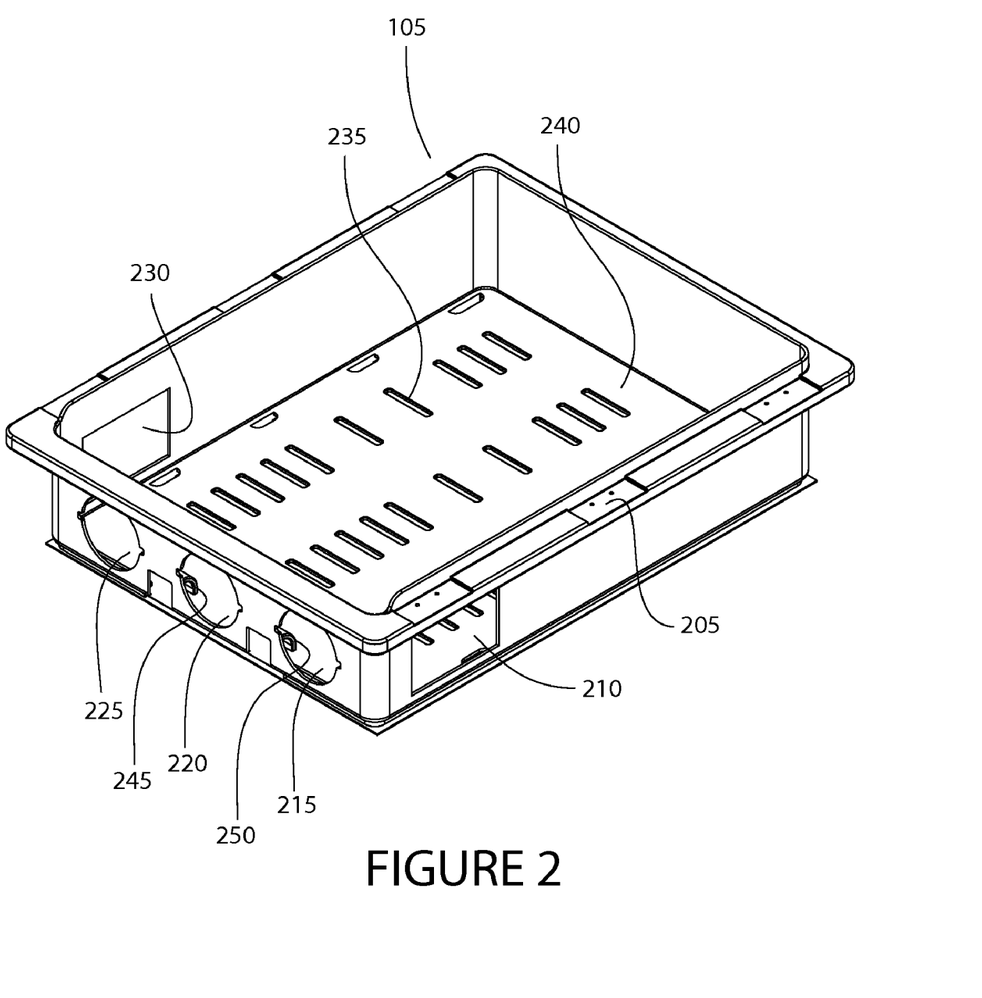
FIG. 2 shows a perspective view of an exemplary case for a cabinet according to principles of the invention.
Figure 6:
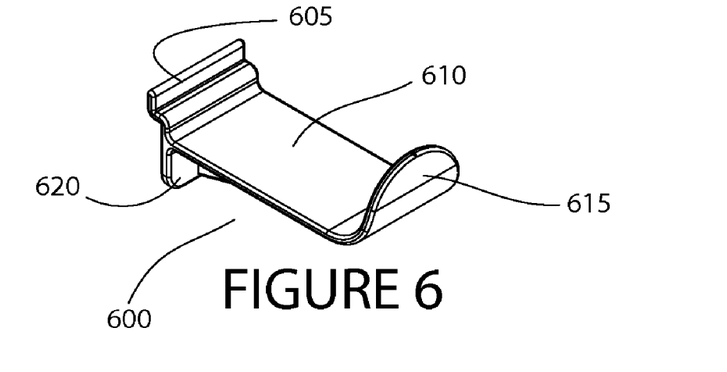
FIG. 6 shows a top perspective view of an exemplary bracket for a cabinet according to principles of the invention.
Figure 7:
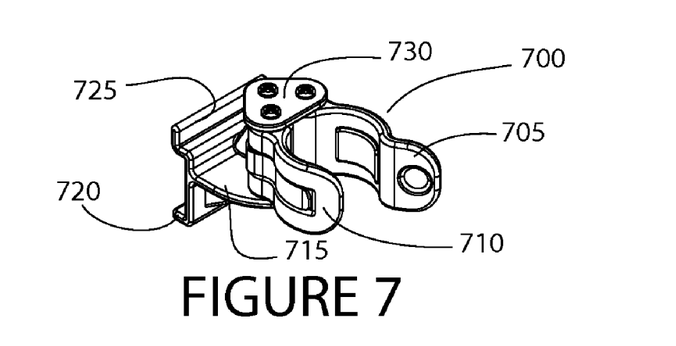
FIG. 7 shows a top perspective view of an exemplary clamp for a cabinet according to principles of the invention.
Figure 8:
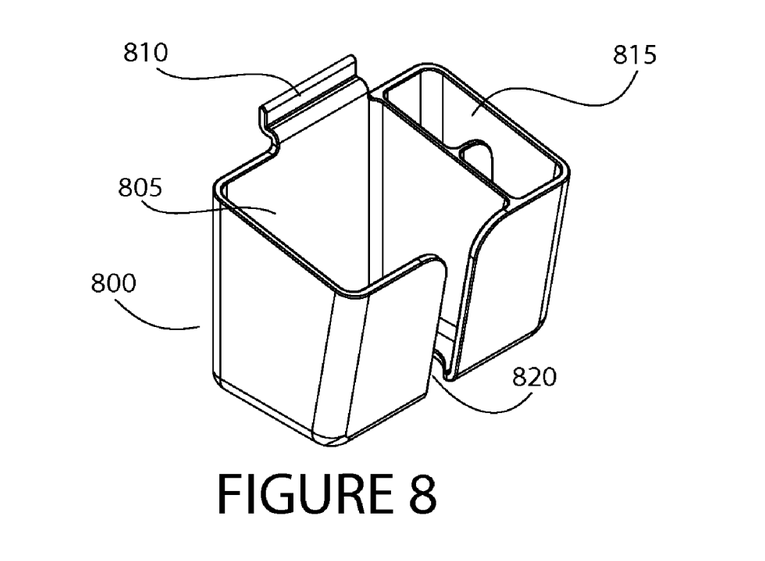
FIG. 8 shows a top perspective view of an exemplary cup for a cabinet according to principles of the invention.
Figure 9:
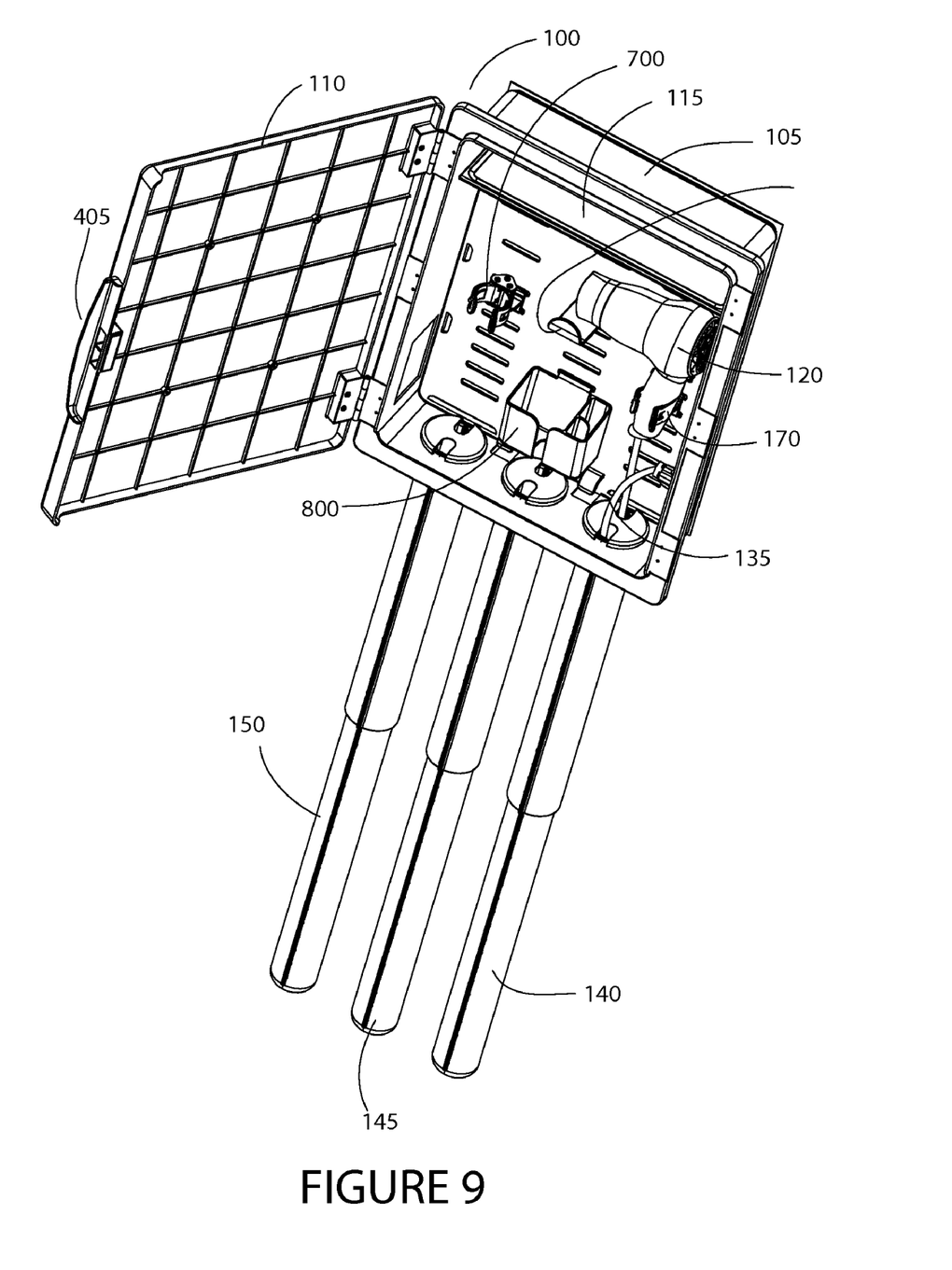
FIG. 9 shows another perspective view of an exemplary cabinet, in an open position, with clamps for holding an electrical appliance, an electrical outlet for supplying electrical power to the appliance, and an electrical cord management device for controllably extending and retracting the cord to facilitate use of the appliance and storage of the cord, according to principles of the invention.

Referring to FIGS. 1 and 9, in which like parts are indicated with the same reference numerals, various views of an exemplary cabinet 100 with clamps 170 for holding an electrical appliance 120, an electrical outlet 130 receives a plug 125 to supply electrical power to the appliance 120, and a plurality of electrical cord management devices 140-150 for controllably extending and retracting the cords 135 to facilitate use of the appliance 120 and storage of the cord 135 are conceptually shown. The exemplary cabinet 100 includes a main housing 105 defining a storage compartment 105. The exemplary cabinet 100 also includes means for holding contents. A plurality of support members 160, 165 and 170 are operably coupled to the back wall 240 (as shown in FIG. 2) of the housing 105. As shown in FIG. 2, the back wall 240 includes a plurality of engagement slots 235 configured to receive upper and/or lower engagement tabs (e.g., tabs 605, 720 and 725, and 810 as shown in FIGS. 6 through 8). The support members 160, 165 and 170, which may be permanently or releasably coupled to the back wall 240, are configured to support objects such as (but not limited to) electrical appliances, toiletries, cosmetics, pharmaceuticals and other store objects.

The exemplary cabinet 100 is configured for storing one or more electrical appliances. Illustratively a hair dryer 120 may be supported by one or more support members, such as bracket 160 and clamp 170, while a curling iron or other appliance may be supported by one or more other support members, such as a cup 165. Other appliances, such as (but not limited to) an electric razor or electric toothbrush may be supported on one or more of the support members 160, 165 and 170 in addition to or in lieu of a hair dryer 120.

Figure 4:
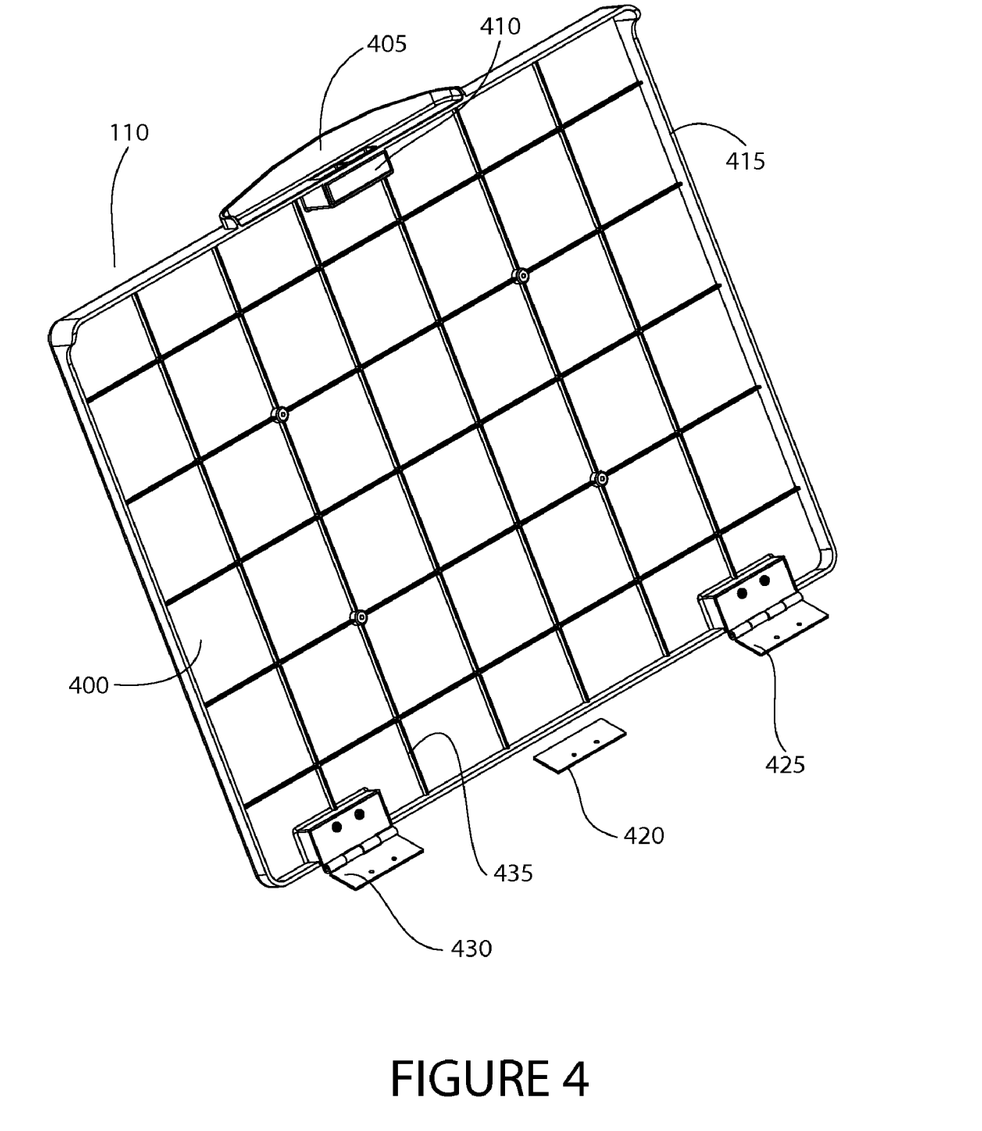
FIG. 4 shows a perspective view of an exemplary cabinet door and hinges for a cabinet according to principles of the invention.

The exemplary cabinet 100 includes means for supplying electrical power to a stored appliance. As illustrated in FIGS. 1, 2 and 9, one or more outlet apertures 210 and 230 in the cabinet 100 housing 105 provide convenient access to one or more electrical outlets, such as (but not limited to) conventional NEMA sockets with or without corresponding switches (e.g., Ground Fault Circuit Interrupter (GFCI) or an Appliance Leakage Current Interrupter (ALCI) switches). Preformed outlet apertures, such as 210 and 230 in FIG. 2, or removable panels, cutouts, patterns or perforations, such as the removable panel 155 shown in FIG. 1, for creating an outlet aperture 210, 230, may be provided on any and all sides of the housing 105 as shown in FIG. 4. Electrical plugs 125 for the appliances 120 are mechanically and electrically connected to the outlets 130. The plugs 125 supply electrical power from the outlets 130 to the appliance 120 via corresponding electrical power cord 135. Cord holders 245, 250 may be provided to route and hold a section of the electrical cord 135 against the housing 105.

The exemplary cabinet 100 includes recesses 205 for mounting hinges. Recesses may be provided on the left, right or both sides of the cabinet 105. Hinges 425-403 are either surface-mounted or recessed (e.g., mortised). Surface-mounted hinges, as the name implies, are mounted on the surface of the pieces being hinged. Recessed hinges require removed or omitted material to allow the hinge to be recessed and fitted into the mounting surface.

The exemplary cabinet 100 includes electrical cord management means for controllably allowing extension and retraction of an electrical cord to facilitate use of an appliance and storage of a cord. A plurality of tubes 140-150 extend downwardly from tube apertures 215-225 in the bottom ledge of the housing 105. Each tube, such as the tube 140 shown in FIG. 3, may comprise one or more permanently or releasably attached sections 335, 345. To facilitate installation and packaging, the tubes 140 may comprise separable and/or telescoping sections 335, 340. Each tube 140 includes a central channel 310, a closed bottom end 330 and an open top end 305. The channel 310 allows sliding motion of the cord weight 320 along the longitudinal axis of the tube 140. To prevent inadvertent withdrawal of the weight, a removable cap 305 with apertures for passage of drape cord is provided at the top end of the tube. Each tube 140 should be approximately at least as long as ½ the length of the cord 135 stored therein.

Figure 3:
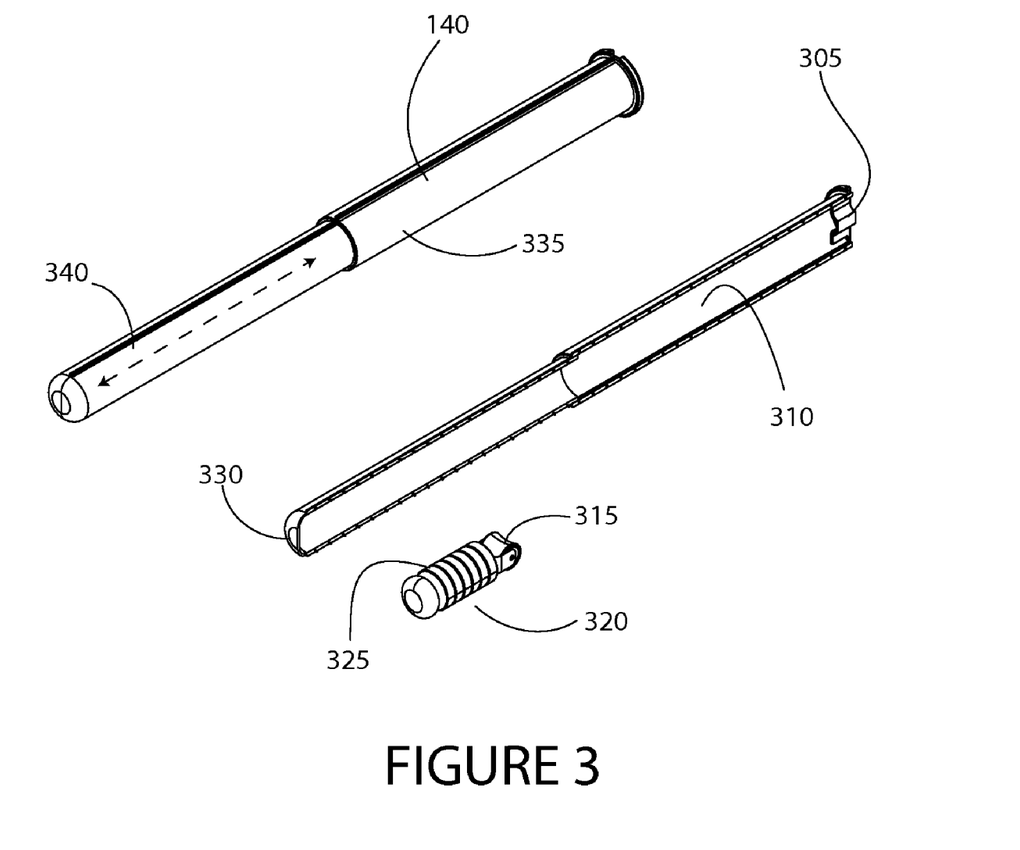
FIG. 3 shows perspective and cutaway views of an exemplary cord tube and weight for a cabinet according to principles of the invention.

A biasing means, such as a cord weight 320 (as shown in FIG. 3) or tension spring, is slidingly coupled to each draped portion of electrical cord 135. The weight 320 comprises a suspended mass 325 to exert a downward force and a means for sliding engagement of the draped portion of electrical cord 135. Illustratively, such means may comprise the sliding coupling 315 such as a roller, band or slider to transmit the downward force of the weight 320 to the engaged cord 135. However, other means for sliding coupling, such as a pulley with a hook or loop, a loop or sleeve of pliable material, or other means of sliding mechanical coupling may be utilized in lieu of the sliding coupling 315. The mass 325 may be adjustable, with units of mass that can be added or removed, such as via mechanical (e.g., threaded engagement or coupling) to achieve a desired weight. Thus, the weight 320 can be configured to apply a desired retraction force.

In use, the biasing means exerts a downward force that is sufficient to draw the draped portion of the electrical cord 135 downwardly into a tube 140-150 when no withdrawing force is applied or when an applied withdrawing force is relieved from the cord 135. A loose section of electrical cord 135 between the plug 125 and appliance 120 may be draped into each tube 140-150. When the appliance is not in use, the cord 135 is neatly retracted into the tube 140-150.

With reference to FIG. 4, the exemplary cabinet 100 further includes a hinged mirror door. Hinge assemblies 425, 430 are provided for mounting and supporting a door 110 on the housing 105. The hinge assemblies may be selectively mounted on the right or left sides of the cabinet 100 to allow opening the door from either side. The door 110 is pivotally connected to the housing 105 at the hinge assemblies 425, 430 and movable between an open position allowing access to the interior compartment of the housing 105 and a closed position. The door 110 is preferably designed to support a mirror 175 on the exterior surface of the door 110, as illustrated in FIG. 1. The door 110 may optionally include a second mirror (not shown) on the interior surface 400 of the door 110 facing the housing. Flanged edges 415 and ribs 435 strengthen the door 110.

The door 110 and the housing 105 also include a handle and corresponding closure means for holding the door 110 in a closed configuration. In an exemplary embodiment, a handle 405 as shown in FIG. 4 may be connected to the door 110. When a user desires to open the door 110, the user pulls outwardly on the handle 405, causing the door 110 to pivot about the hinges 425, 430 to an open configuration. A releasable closure is provided to secure the door in a closed position. In one embodiment, the releasable closure may be a magnetic closure assembly 410 connected either to the door 110 or to the housing 105 and a corresponding metal plate 420 attracted to and opposite the magnetic closure assembly 410, as shown in FIG. 4. Other releasable closures such as mechanical latches and catches may be utilized in lieu of or in addition to a magnetic closure.

The back wall of the cabinet 100 includes a plurality of slots 235 for releasably engaging means for holding contents, as shown in FIGS. 5 through 8. A plurality of releasably mounted support members 115, 600, 700, 800 may be operably engaged in slots 235 of the back wall of the housing 105. The support members 115, 600, 700, 800 are configured to support objects. Advantageously, this embodiment allows a custom configuration of releasable support members 115, 600, 700, 800 to achieve a desired support configuration.

Figure 5:
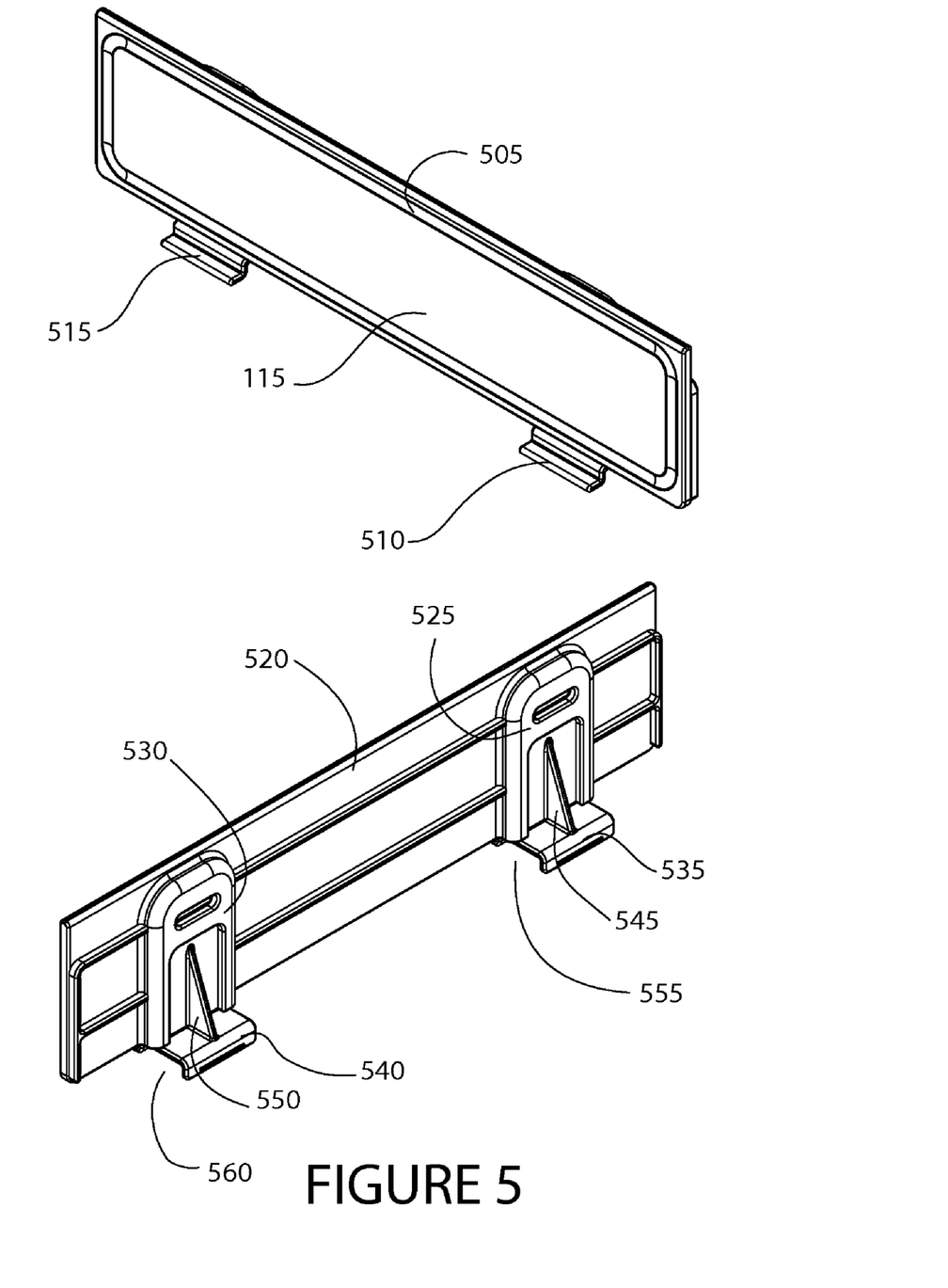
FIG. 5 shows top and bottom perspective views of an exemplary shelf for a cabinet according to principles of the invention.

With reference to FIG. 5, a shelf 115 is shown. A lip 505 surrounding the top surface of the shelf 115 prevents articles from sliding or rolling off the shelf 115. Brackets 555, 560 with horizontal shelf supports 525, 530, slot engagement tabs 510, 515 and 535, 540, and gussets 545, 550 for reinforcement are provided. The shelf 115 may be permanently or releasably attached to the brackets 555, 560. The bottom surface 520 of the self may include ribs for strengthening the shelf and/or engaging and interlocking the brackets 555, 560.

Now with reference to FIG. 6, a support bracket 600 is shown. An elongate cantilever horizontal structure 610 may carry the load of a supported object. A lip 615 at the distal end prevents articles from sliding or rolling off the distal end. An upper slot engagement tab 605 and vertical support base 620 engage and abut the back wall 240 of the cabinet 105.

Now with reference to FIG. 7, a support clamp 700 is shown. A pair of opposed grasping arms 705, 710 are configured to form a u-shaped clamp to grip an object. The arms 705, 710 may be biased towards one another to enhance gripping. Pivot attachment assembly 730 allows each arm and the u-shaped clamp to independently pivot. A cantilever horizontal base 715 supports the u-shaped clamp. Slot engagement tabs 720, 725 are provided to engage slots 235 in the back wall 240.

Referring now to FIG. 8, a cup 800 is shown. A slot engagement tab 810 is provided to engage a slot 235 in the back wall 240. A plurality of storage compartments 805, 815 are formed in the exemplary cup 800. A slot 820 extending through the front and bottom of the cup allows elongate structures (e.g., cords and handles) to pass therethrough.

The cabinet 100 is preferably designed to be manufactured easily and economically from lightweight molded plastic components, with the exception of the mirror and possibly the handle, closures, hinges and other hardware. Structural reinforcements may be provided on various surfaces to strengthen the apparatus without unduly increasing weight. Such structural reinforcements may include strengthening ribs, flanges, gussets and other structurally enhancing features suitable for the given manufacturing process.

The cabinet 100 may be positioned on a wall alongside a vanity or sink. Alternatively, the cabinet 100 may be positioned on a wall behind a vanity or sink, in place of a conventional medicine cabinet. However, those skilled in the art will appreciate that the invention is not limited to any specific location.

In a preferred implementation, the cabinet 100 is recessed into a wall. The recessed cabinet 100 fits through an opening in the wall surface and into the wall interior, behind the outer surface of the wall and between adjacent wall studs structurally forming the wall. In such an implementation, the downwardly extending tubes 140-150, extend downwardly in the wall interior.

In another implementation, the cabinet 100 may be flush mounted on a wall. A flush mounted cabinet 100 is attached to the exterior surface of the room wall. Advantageously, it can be easily installed without creating a hole in the wall. A drawback, however, is that it projects forwardly away from the wall and exposes the tubes 140-150. Optionally, a decorative cover may be provided to conceal the otherwise exposed tubes 140-150 of a flush mounted cabinet 100.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A wall mounted cabinet comprising
a housing defining an interior compartment with a top, bottom, left side and right side; said housing being recess mounted in a corresponding hole formed in the wall; and
a door hingedly mounted to said housing; and
a plurality of supports attached to the housing and configured to support a plurality of objects within the interior compartment, said plurality of objects including at least one electrical appliance; and
an outlet aperture in said housing, said outlet aperture configured for receiving an electrical outlet for supplying electrical power to the electrical appliance; and
an electrical cord management device for controllably extending and retracting an electrical cord of an electrical appliance to facilitate use of the appliance and storage of the cord, said at least one electrical cord management device being attached to the bottom of said housing; and
a tube aperture in the bottom of the housing; and
said electrical cord management device comprising a tube containing a cord weight, said cord weight including a mass and a means for movable attachment to the electrical cord, said cord weight being disposed within and movable along a longitudinal axis of the tube from a top position of the tube to bottom position of the tube, said tube having an open proximal end and a closed distal end, the proximal end being attached to the bottom of the housing at the tube aperture and the distal end being outside of the housing, the tube defining a passageway, behind the wall, from the bottom of the housing to the distal end of the tube.

2. A wall mountable cabinet according to claim 1, said means for movable attachment to the electrical cord comprising a slider coupling configured for sliding engagement of the electrical cord, said cord weight being movable from a top position of the tube to bottom position of the tube.

3. A wall mountable cabinet according to claim 1, said cord weight including an adjustable mass assembly and a slider coupling configured for sliding engagement of the electrical cord, said cord weight being movable from a top position of the tube to bottom position of the tube, said adjustable mass assembly being selectively adjustable from a first mass to a second mass by defining a number of mass units to constitute the adjustable mass assembly.

4. A wall mountable cabinet according to claim 1, said tube comprising a plurality of attached tubular sections.

5. A wall mountable cabinet according to claim 1, said tube comprising a plurality of telescopically coupled tubular sections.

6. A wall mountable cabinet according to claim 1 further comprising a top cap over the proximal end of the tube, said top cap having at least one aperture for passage of the electrical cord.

7. A wall mounted cabinet comprising
a housing defining an interior compartment with a top, bottom, left side and right side and a back wall, said back wall including a plurality of engagement tab slots, said housing being recess mounted in a corresponding hole formed in the wall;
a door hingedly mounted to said housing;
a plurality of supports releasably attachable to the housing and configured to support a plurality of objects within the interior compartment, said plurality of objects including at least one electrical appliance, each of said plurality of supports including at least one engagement tab configured for sliding releasable engagement of any one of the plurality of engagement tab slots;
an outlet aperture in said housing, said outlet aperture receiving an electrical outlet for supplying electrical power to the electrical appliance; and
at least one electrical cord management device for controllably extending and retracting an electrical cord of an electrical appliance to facilitate use of the appliance and storage of the cord, said at least one electrical cord management device being attached to the bottom of said housing; and
a tube aperture in the bottom of the housing; and
said electrical cord management device comprising a tube containing a cord weight, said cord weight including a mass and a slider coupling configured for sliding engagement of the electrical cord, said cord weight being disposed within and movable along a longitudinal axis of the tube from a top position of the tube to bottom position of the tube, said tube having an open proximal end and a closed distal end, the proximal end being attached to the bottom of the housing at the tube aperture and the distal end being outside of the housing, the tube defining a passageway, behind the wall, from the bottom of the housing to the distal end of the tube.

8. A wall mounted cabinet according to claim 7, said plurality of supports including at least one support from the group consisting of a support bracket, a cup, a clamp and a shelf.

9. A wall mounted cabinet according to claim 7, said cord weight including an adjustable mass assembly, said adjustable mass assembly being selectively adjustable from a first mass to a second mass by defining a number of mass units to constitute the adjustable mass assembly.

10. A wall mounted cabinet according to claim 7, said tube comprising a plurality of attached tubular sections.

11. A wall mounted cabinet according to claim 7, said tube comprising a plurality of telescopically coupled tubular sections.

12. A wall mountable cabinet according to claim 7, said at least one electrical cord management device comprising a tube containing a cord weight, said cord weight including a mass assembly and a slider coupling configured for sliding engagement of the electrical cord, said cord weight being movable from a top position of the tube to bottom position of the tube, further comprising a top cap over the proximal end of the tube, said top cap having at least one aperture for passage of the electrical cord.

* * * * *